Patented Oct. 26, 1926.

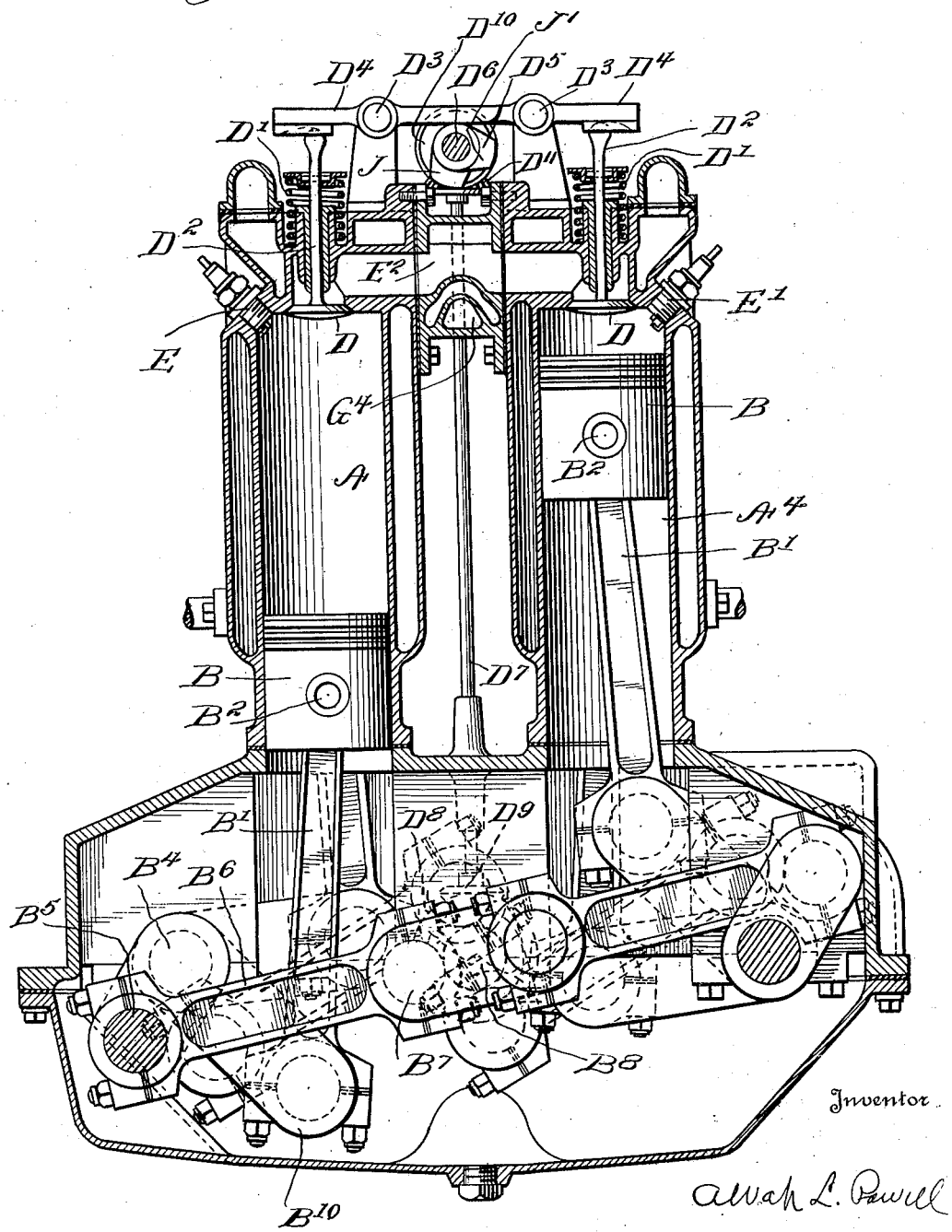

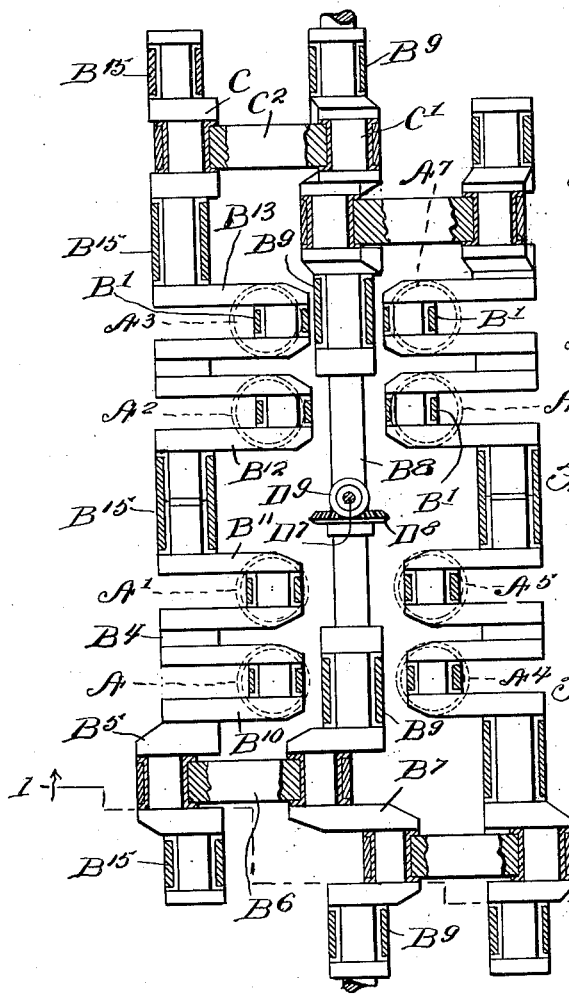

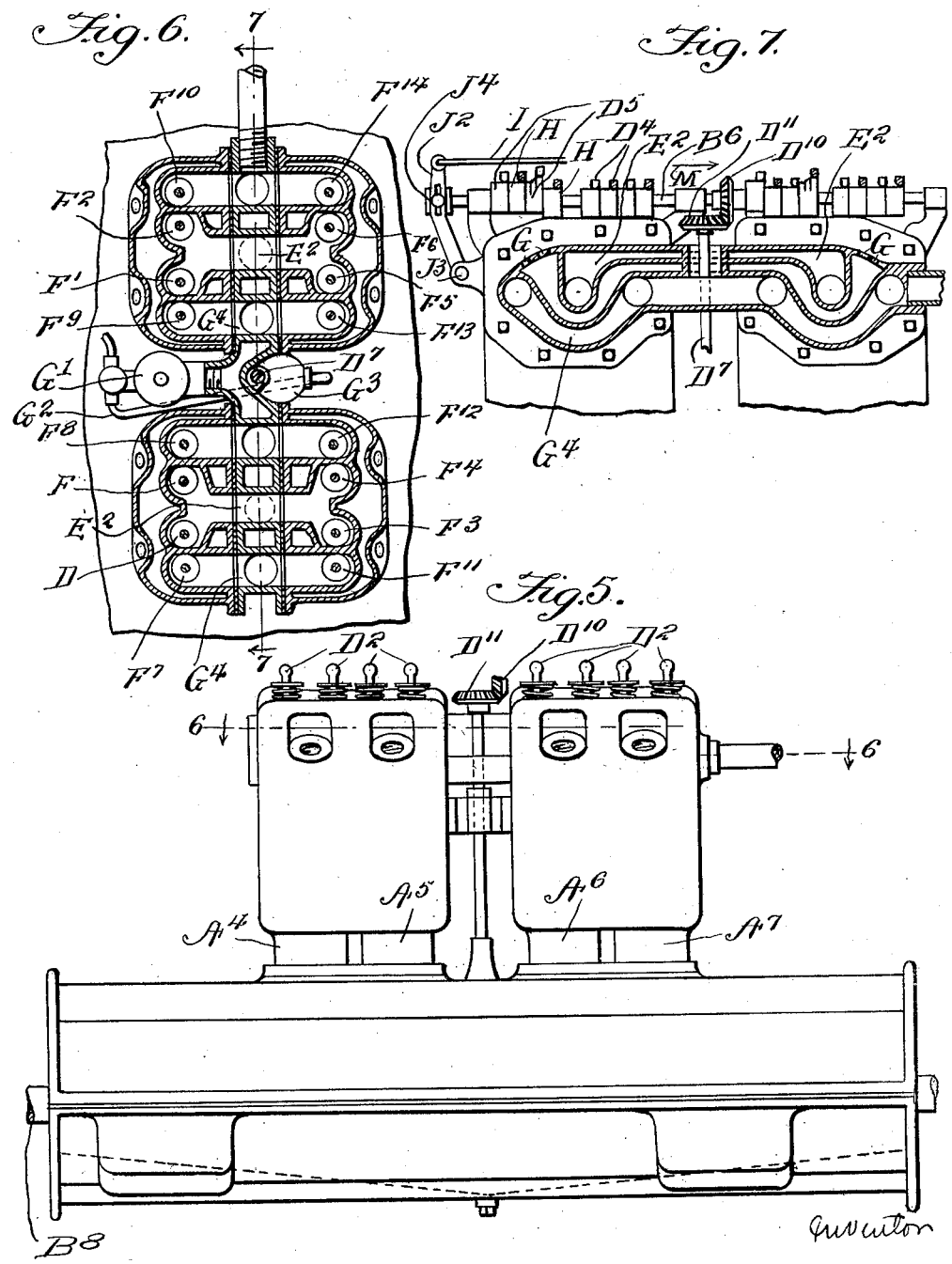

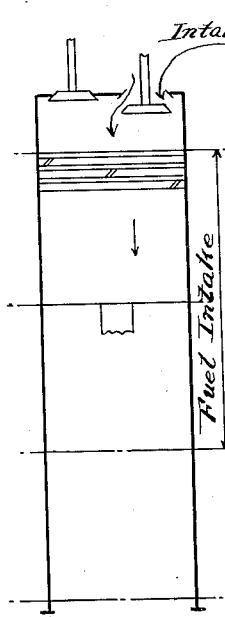
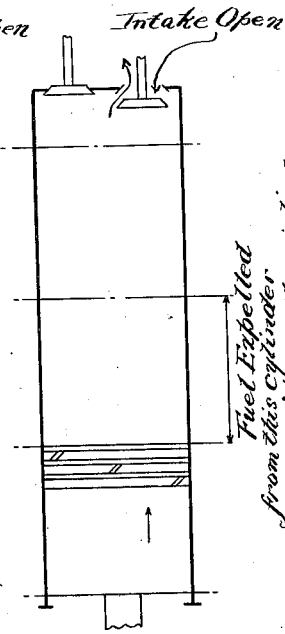
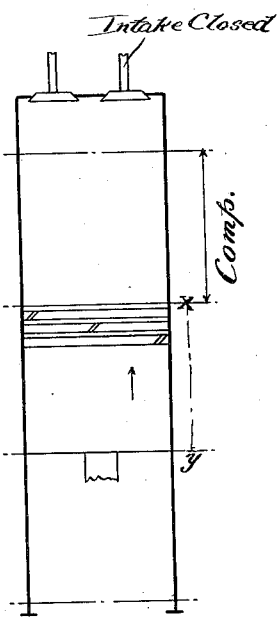
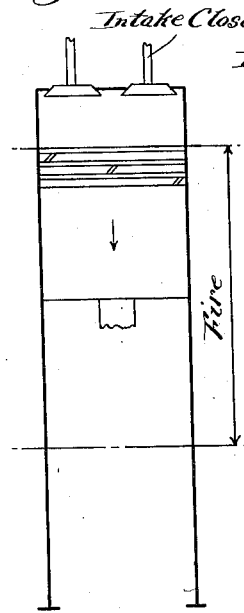
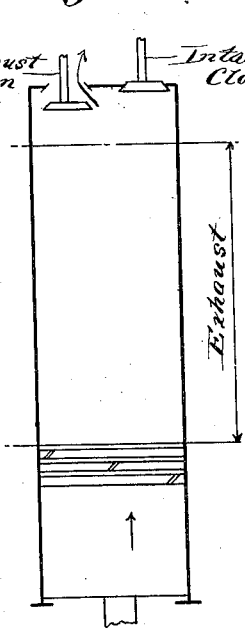
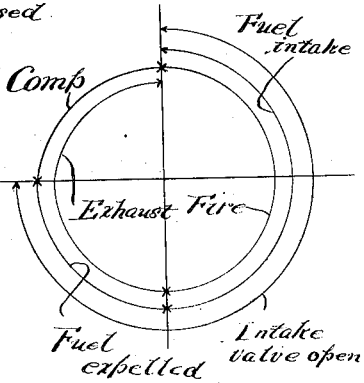

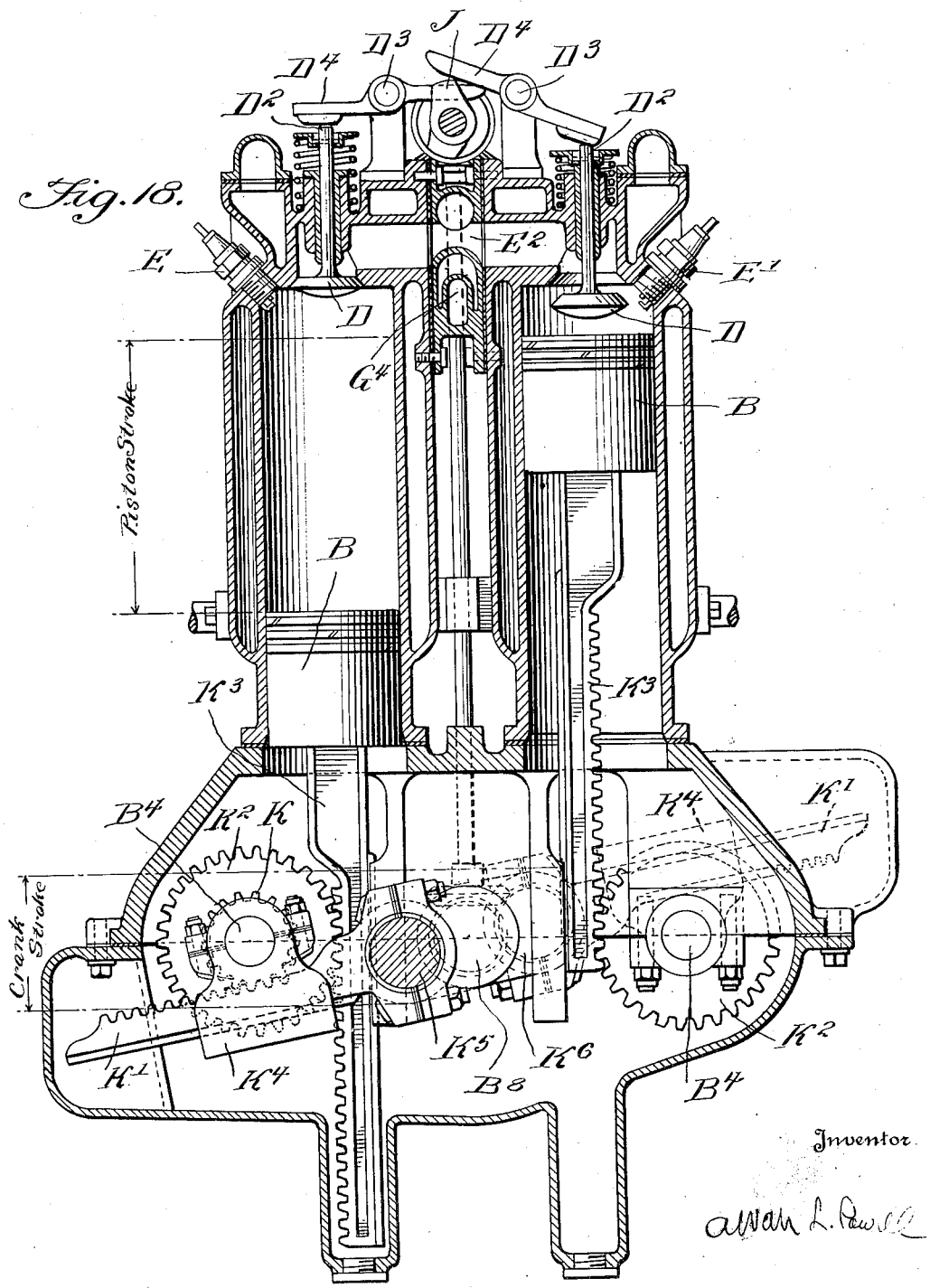

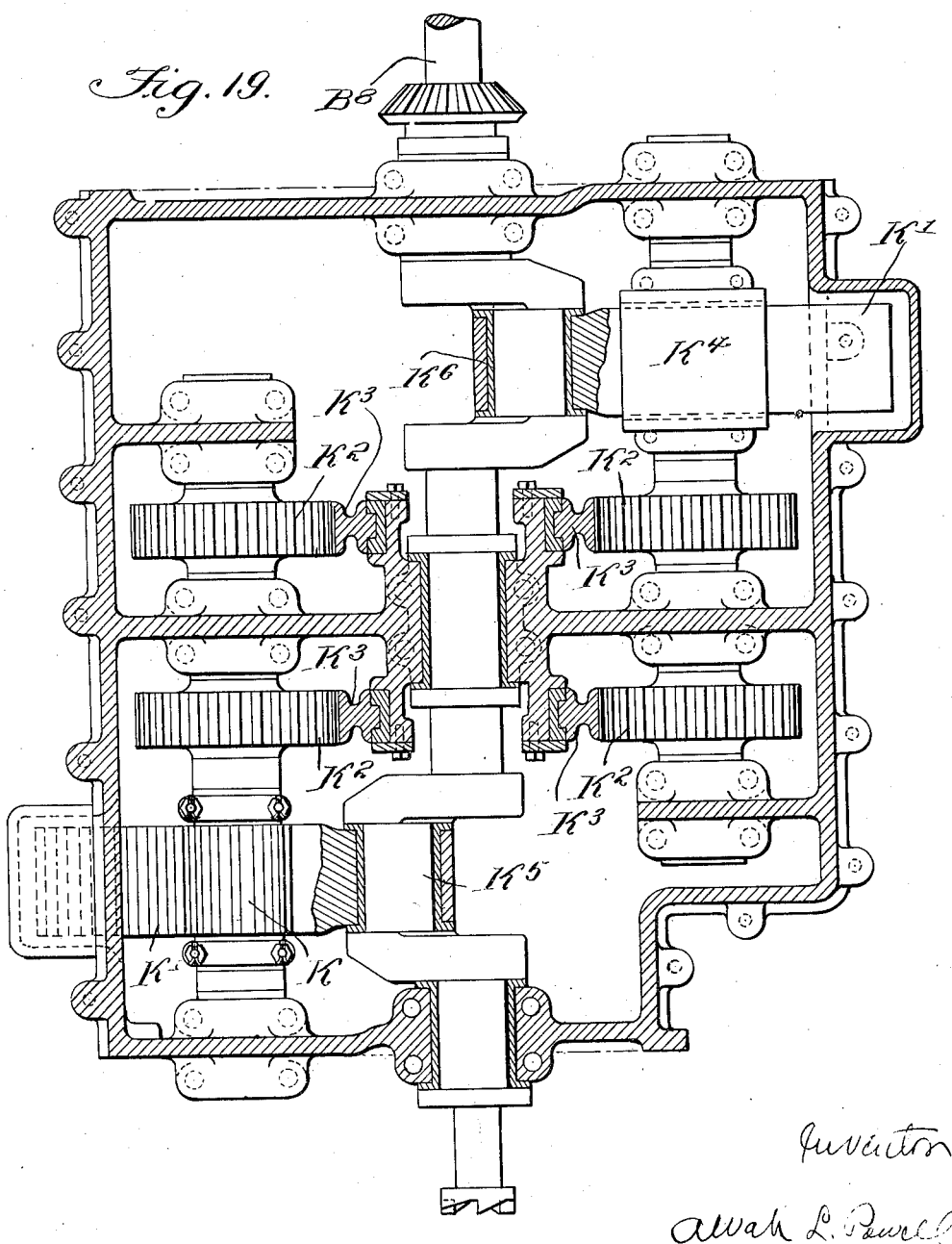

1,604,603

UNITED STATES PATENT OFFICE.

ALVAH L. POWELL, OF MILES CITY, MONTANA, ASSIGNOR TO THE A. L. POWELL POWER CO., INC., OF MILES CITY, MONTANA, A CORPORATION.

INTERNAL-COMBUSTION ENGINE.

Application filed August 18, 1921. Serial No. 493,314.

My invention relates to improvements in internal combustion engines in which I secure a high degree of efficiency by the novel means I employ for effecting the intake and compression of the explosive charge, and the adjustable means I use for changing the volume of intake stroke, and the further means used for transmitting the power developed to the crank shaft of the engine. My invention has particular application to the type of engine used for high altitudes, or in varying altitudes, as in the case of aviation motors. In these prime movers the efficiency usually falls off rapidly as they ascend, but with my improvement the induction of air is increased when higher levels are reached by varying the face of the intake valve cams, as hereinafter to be described, this variation being attained preferably by manually operated means, controlled by the engineer. My invention includes the principle of employing a cylinder, or cylinders, bored to a relatively large diameter and by this means I am able to quickly change the volume of intake by a small change in valve movement, and I can also obtain a quick expansion of the combustion charge. The relatively large piston diameter enables me to get full power for the length of crank stroke on power shaft, and as the piston stroke is made double that customary for a given crank stroke a much more powerful engine may be made where my improvements are used than would be the case if both piston stroke and crank stroke were equal, and this advantage is secured with comparatively slight additions to the ordinary machine or engine. By making the cylinder bore of a relatively large diameter, that is, relatively to the crank stroke, the volume of gas and air is greater than that of the ordinary engine in a ratio governed by the relation of diameter to circumference. In other words, intake volume increases as the square of the diameter while the radiation surface is directly proportional to the diameter. The relatively greater volume requires a greater distance of stroke, on the other hand the combustion that occurs immediately after ignition will still be the maximum effect of said combustion but it will not include a complete reduction of the live fuel to carbonic acid, or carbonic oxide. The combustion will continue for a period beyond that of the short stroke engine and the larger piston area, combined with the leverage mechanism that is to be described, will permit the absorption of the heat developed by the further combustion, and of a percentage of the heat remaining after combustion has ceased. The radiating surface of the cylinder will have a proportion to the working stroke less than that possible in the conventional gas engine, and less heat will be dissipated by the factor of radiation. The relation between the cylinder diameter and crank stroke therefore becomes an element in the designing of engines of the type I herein describe. The stroke of the crank must be less than that of the piston, while the cylinder diameter must be great enough, as compared with said crank stroke, to take in a volume of gas the combustion of which will give a high initial effect proportional to the stroke of a short stroke engine for the period of said short stroke and, at the same time, the said volume must be sufficient to assure positive pressure on crank through the latter part of stroke. In this way high thermal and mechanical efficiency will be attained at the same time.

In the accompanying drawings I show an engine equipped with my improvement, in which—

Fig. 1 is a transverse section through the engine with parts in elevation.

Fig. 2 is a plan view of the transmission gear and crank shaft for an eight cylinder engine.

Fig. 3 is a diagrammatic view of the crank and transmission movements.

Fig. 4 is a diagrammatic view showing piston rod, transmission and crank connections.

Fig. 5 is a side elevation.

Fig. 6 is a section, approximately on a line 6—6, Fig. 5.

Fig. 7 is a section on the line 7—7, Fig. 6.

Figs. 8, 9, 10, 11, 12 are diagrammatic views, to show the action of pistons, admission and exhaust valves.

Fig. 13 is a diagram, showing the details of the operative cycle,

Figs. 14, 15, 16, are detail views of my adjustable cam.

Fig. 17 is a diagram to show the action of the adjustable cam, with reference to operative cycle.

Fig. 18 is an elevation, in section, of a modification of my invention.

Fig. 19 is a semi-sectional plan of the transmission and power gear of said improvement, for a four cylinder engine.

Fig. 20 is a plan view of the air and gas throttling means.

In Fig. 1, a piston B is slidably mounted in a cylinder A. From piston B a piston rod $B^1$, mounted on a pin, $B^2$, engages a crank $B^{10}$, said crank preferably forming part of a transmission crank shaft $B^4$, Figs. 1, 2, 3, 4. At some point on the transmission crank shaft $B^4$ there is a second crank, $B^5$, Figs. 1 and 2, that swings on a radius less than that of the crank $B^4$. From $B^5$ a connecting rod, $B^6$, Figs. 1 and 2, engages a crank $B^7$, Fig. 2, on a power shaft $B^8$. Transmission crank shaft $B^4$ is mounted in bearings, as shown at $B^{15}$, $B^{15}$, $B^{15}$, $B^{15}$, Fig. 2. These bearings form, preferably, a part of the engine frame. The power shaft $B^8$ is mounted in bearings $B^9$, $B^9$, $B^9$, $B^9$, Fig. 2. It will be noted that the engine, as shown in plan in Fig. 2 has eight cylinders, A to $A^7$, inclusive, each being indicated by dotted lines. Each cylinder contains a piston rod similar in all respects to that described in reference to A, and the piston rods of cylinders A and $A^1$ engage cranks $B^{10}$ and $B^{11}$ respectively on the transmission crank shaft $B^4$. The piston rods of cylinders $A^2$ and $A^3$ likewise engage cranks $B^{12}$ and $B^{13}$ on a second crank shaft $B^4$, the axis of rotation of both crank shafts being in alignment and the two crank shafts being identical in structure. The above arrangement of parts is duplicated on the opposite side of the engine.

Taking one side of the engine, in this case the side having cylinders A, $A^1$, $A^2$, $A^3$, it will be seen in Fig. 2 that the transmission cranks of greater radii are placed in operative alignment with the respective cylinders to which they are connected, but that the transmission crank of lesser radius, $B^5$, is at a point on said shaft $B^4$ near the end thereof. At an opposite point on the second crank shaft $B^4$, a second crank of minor radius C connects with a crank $C^1$, on power shaft $B^8$. Power is therefore transmitted from shafts $B^4$ to shafts $B^8$ by the two cranks $B^5$, C, and connecting rods $B^6$, $C^2$.

The cranks $B^{10}$, $B^{11}$, are at end of down stroke; the cranks $B^{12}$, $B^{13}$, are at a point half way on down stroke. In Fig. 3 it will be seeen that the said cranks lie in planes at right angles to the planes of the cranks on power shaft. On the opposite side of engine four cylinder, $A^4$ to $A^7$, inclusive, are also mounted and the power from them is transmitted to shaft $B^8$ by cranks and connecting rods, the latter the same as those just described, but the position of the pistons in $A^4$, $A^5$, is at top of stroke (Fig. 3), and the pistons in $A^6$, $A^7$, are at a point half way on downstroke. The movement of the pistons of all the cylinders is therefore as follows:

A, $A^1$, full downstroke.
$A^2$, $A^3$, half upstroke.
$A^4$, $A^5$, top of upstroke.
$A^6$, $A^7$, half of downstroke.

In the head of cylinder A there is a poppet valve D, held to its seat by a spring $D^1$ on the stem $D^2$. On a pin $D^3$ is mounted a rocker, $D^4$, while the other end sets on a cam $D^5$. The cam $D^5$ is mounted on a cam shaft, $D^6$, said shaft being mounted in bearings, preferably forming part of the engine frame. From a point on said cam shaft, a shaft $D^7$ passes vertically to a point adjacent to the power shaft $B^8$. On $B^8$ a bevel gear, $D^8$, meshes with a bevel gear $D^9$, on said vertically disposed shaft, each gear being fixed to its respective shaft by appropriate means. On shaft $D^6$ a bevel gear $D^{10}$ (Fig. 5) meshes with a bevel gear $D^{11}$ on the vertically disposed shaft. These gears are also fixed to the shafts on which they are shown, and their diameters, as well as the diameters of the bevel gears on $B^8$ and its mate on $D^7$, are in a ratio of two to one, as is customary on all four cycle engines. Each cylinder is fitted with an ignition plug, as shown at E, $E^1$, Fig. 1.

In Figs. 6, 7, I show the manifold system used in my invention. Each cylinder has an inlet valve as already described, D, Fig. 1, and this communicates with an intake manifold $E^2$. This manifold passage communicates with the opposite cylinder and valve, Fig. 1. The exhaust valves are shown in Fig. 6 and are the same in construction and operation as the intake. In Fig. 6 the position of all valves are indicated, as follows: intake, D, F, $F^1$, to $F^6$, inclusive; exhaust, $F^7$ to $F^{14}$, inclusive. The manifold breathes air through holes G, Fig. 7. The carburetor $G^1$ has connections to a pipe $G^2$ and the hot air passage in manifold at a point $G^3$, Fig. 6. The exhaust manifold $G^4$ communicates with the exhaust valve openings, as indicated in Fig. 6. By reason of the position of the exhaust manifold with relation to the intake manifold, the heat from the walls of the former transmit a part of the heat of exhaust to the air and gas in said intake manifold, thus raising the general efficiency of the combustion mixture by improving the vaporization of the gas.

The operation of my improved engine is as follows: On intake downstroke, a charge of gas and air is drawn from the manifold, through the means already described and, in the multiple cylinder engine shown, this occurs simultaneously in cylinders A⁴, A⁶, Fig. 2. Assuming that the engine is already running, compression will be taking place at the same time as does the intake action in cylinders A¹, A³; while exhaust is occurring in cylinders A, A². As shown in Fig. 5, my engine is preferably formed of two units, each having four cylinders, vertically disposed and, in each unit, there is, at each revolution, one intake, one compression, one explosion and one exhaust. In the combined units, there are four explosions to each revolution of the power shaft B⁸. On compression stroke, the inlet valve is closed throughout said stroke and the engine operates like any engine of the four cycle type, so far as the number of impulses are concerned. Assuming, however, that the total stroke of piston is eight inches and the crank stroke at power shaft is four inches, the equivalent of the power generated in an engine of the ordinary type would be done in the first four inches of stroke, or slightly more. By reason of the compounding cranks between piston and power shaft this power will be taken by the said power shaft in two inches of the throw of the power shaft crank. For the remainder of the stroke, the balance of the expansion would be transmitted as power to the power shaft, the effect, as a whole, being that of a high-powered engine having a piston diameter large enough to give maximum effect through first half of stroke, and an additional percentage of power through the final four inches of travel, the difference in size of the two structures being no more than the added length of stroke. At high altitudes the engine would be run with the stroke and cams operated as has been described, a large volume of rarefied air being taken in to replace the smaller volume of air taken in at lower altitudes, but of higher initial pressure. At said reduced altitudes the action of the cams with reference to stroke would be modified, as follows:

On compression stroke, the cam controlling the inlet valve continues to hold the said valve open for a part of piston stroke. The action of one cylinder is here taken as a unit. Referring to Figs. 8, 9, 10, 11, 12, this action will be seen to be clearly indicated. In Fig. 8 piston is beginning intake stroke, and the valve is open. In Fig. 9, piston is at end of stroke and valve is open. Fig. 10 shows piston about half way back on compression and the valve has just seated. That part of the combustion charge held within the length of cylinder x—y, Fig. 10, has been forced out into intake manifold and is there taken up by any other cylinder the piston of which is on intake stroke. This gives an agitation to the charge that materially improves the thoroughness of the mixing of the components. In Fig. 11, the remaining charge has been compressed, both valves are shown seated and explosion is about to occur. In Fig. 12 piston is shown at end of power stroke, while the exhaust valve has opened to permit the exit of the charge through the scavenging stroke. In Fig. 13, the action that has been described is shown diagrammatically.

The cams used in my improved engine are shown in detail in Figs. 14, 15. The exhaust cam H is identical with those generally used in gas engines, except that the face is wider, to permit a horizontal movement of the cam shaft to take place without altering thereby the position of a working part of the face of the auxiliary member to be operated. The inlet cam D⁵ is keyed to, or otherwise made rotatable with, shaft D⁶. The inlet cam D⁵ is shaped to operate a cam lever D⁴, and has two adjacent circumferential faces J, J¹, of equal radius with reference to the center of shaft D⁶, but disposed in a way to allow one face to actuate the cam lever at one time, while the other J¹, having the longer dwell, may function at another time. At high altitudes, the face J permits intake for the full outstroke of piston, and closes the valve D so that full compression is obtained on backstroke. On reaching lower altitudes, the operator pulls the arm I, Fig. 7, by any convenient means, not shown, and this rocks the crank J², pivoted on a pin J³, preferably supported at some point of engine frame. The crank J² straddles a shaft B⁶ and by means of the enlarged circumferential faces J⁴, Fig. 7, it moves shaft D⁶ in the direction of arrow, M, Fig. 7. This causes the cam levers, designated herein as D⁴ to engage the shorter face surface of cam D⁵, the bevel surface J⁵ being provided to facilitate this movement. The bevel gear D¹⁰ is fitted to shaft B⁶ by a feather key to allow this movement, or by any conventional means not shown. The fact that the intake levers now rest on the second section J¹ of the cam D⁵ changes the operation of the engine on instroke, while the outstroke is not altered. That is, gas is still taken in for the full period of outstroke but the intake cam, remaining open for a period corresponding from one half to two thirds of instroke, the charge that has just been drawn in is partly rejected, being forced out through the valve, by reason of the action of the intake cam. This rejected part of the charge enters the manifold, from which it is taken by other cylinders of the unit during the intake part of their operation. The direct consequence of this is to cut down the volume of the exploded charge. The movement of the gas to and out of the cylinders conduces to a thorough mixing of the charge, by reason of the agitation to which it is subjected and the heated surfaces with which it comes in contact. The efficiency of the engine is correspondingly raised, the friction of the waste movement of piston being a negligible quantity.

In Fig. 20, I show means for controlling air and gas intake by throttling the intake passages, operable by the engineer by means of rods $M^1$, $M^2$. When running on full stroke this permits partial adjustment of air and gas without operating the cams $D^5$. By the means described I produce an engine that can operate at high and low elevations, at practically equal efficiencies.

It will be observed, from Fig. 1, that my power transmission members are geared down from piston to power shaft by a crank motion similar to that shown in my Patent, Number 1,384,343. By means of this reduction I concentrate the force of a long stroke into a relatively short power crank, as has been previously stated in this specification. The force of piston B (taken for illustration) exerts its pressure on the end of a crank $B^{10}$ that is longer than the cranks $B^5$, $B^7$, Fig. 2. On the expansion stroke of piston the force is against the long crank, while the load on power shaft is against a shorter crank. This relation allows a freer movement of the piston on outstroke, cylinder combustion being improved as a result, for the expansion is against a lesser pressure per unit of linear movement than it would be if coupled directly to the power shaft.

In Figs. 18, 19, I show a modification of my transmission gear. In this construction, I use the improvement covered by my Patent, Number 1,384,335, except as will be described herein. The power is transmitted by a pinion K, rigidly mounted on a shaft $B^4$. This pinion meshes with a rack $K^1$, that acts as a crank connecting rod to the power shaft crank $B^8$. The piston thrust is imparted to a gear $K^2$ on shaft $B^4$, by a toothed rod $K^3$, rigidly fastened to piston B by any convenient means. It is evident that by this construction all side slap on the piston is eliminated. The toothed rod $K^1$ is held in engagement with the pinion K by a swinging guide $K^4$. This guide straddles $K^1$ and is loosely mounted on shaft $B^4$. A plate is fixed in the back of said $K^4$, and is held thereto by any convenient means, not shown. It will be noticed that between the pinion K and the gear $K^2$ there is a difference in pitch radius that establishes a ratio between them of two to one, making the action of this form of my invention the same as that of the crank transmission that has already been described. In Fig. 19 it will be seen that the gears $K^2$, $K^2$, $K^2$, $K^2$, are spaced to take up the thrust of a cylinder each, although said cylinders are not represented in the drawing. The transmission to power shaft cranks is indicated at two points, $K^5$, $K^6$. The location of the transmission at lower part of engine makes it possible to have it immersed in oil, for lubrication throughout its operation.

By the means I have described I secure a construction that combines simplicity of operating parts with great efficiency in the running of an engine equipped therewith. The volume of intake will be under control of the engineer, rapid combustion is assured, a sensitive delivery of the developed power is transmitted to the engine, greater power is transferred to the crank shaft than would be the case with an engine of the ordinary type, having piston stroke and crank equal, expansion is conserved by the arrangement of the long radius of a larger pinion with reference to the smaller radius of a lesser pinion; a higher value is given the fuel by the thoroughness with which it is blended with the air, and the transmitting members are properly lubricated without any complication of added parts. Such an engine will work efficiently at high and low altitudes.

I do not limit myself to the exact construction shown in the drawings and specifications herein submitted.

What I believe is new and ask to have protected by Letters Patent, is—

In an internal combustion engine, a cylinder, a piston slidable therein, a power shaft, an intermediate crank shaft, means connecting said piston to the intermediate crank shaft, means operatively connecting the intermediate crank shaft to the power shaft, a cam shaft and means operatively connecting the power shaft to the cam shaft, said last mentioned means including a gear on the power shaft, a rod extending from the power shaft to the cam shaft, gears on the ends of said rod and a gear on the cam shaft, the gears on the opposite ends of the rod engaging the gears on the power shaft and the cam shaft respectively.

In testimony whereof I have affixed my signature.

ALVAH L. POWELL.